(12) United States Patent
Song (10) Patent No.: US 8,826,934 B2
(45) Date of Patent: Sep. 9, 2014

(54) APPARATUS FOR PREVENTING BACKFLOW OF FILL VALVE IN WATER TOILET

(75) Inventor: Tae Gwang Song, Gimpo-si (KR)

(73) Assignee: Watos Corea Co., Ltd. (KR)

( * ) Notice: Subject to any disclaimer, the term of this patent is extended or adjusted under 35 U.S.C. 154(b) by 525 days.

(21) Appl. No.: 13/259,734

(22) PCT Filed: Jan. 11, 2010

(86) PCT No.: PCT/KR2010/000157
§ 371 (c)(1),
(2), (4) Date: Sep. 23, 2011

(87) PCT Pub. No.: WO2010/114218
PCT Pub. Date: Oct. 7, 2010

(65) Prior Publication Data
US 2012/0012193 A1 Jan. 19, 2012

(30) Foreign Application Priority Data
Mar. 31, 2009 (KR) .................. 10-2009-0027781

(51) Int. Cl.
*F16K 31/34* (2006.01)
*F16K 15/14* (2006.01)
*E03D 1/32* (2006.01)

(52) U.S. Cl.
CPC ............... *F16K 15/148* (2013.01); *F16K 31/34* (2013.01); *E03D 1/32* (2013.01)
USPC ........... 137/414; 137/218; 137/441; 137/442; 137/450; 137/451; 137/854

(58) Field of Classification Search
CPC ......... F16K 31/24; F16K 31/26; F16K 31/34; F16K 31/20; F16K 21/18; F16K 33/00; E03D 1/32
USPC ........ 137/414, 854, 434, 409, 441, 442, 450, 137/451, 215–218
See application file for complete search history.

(56) References Cited

U.S. PATENT DOCUMENTS 2,395,906 A * 3/1946 Owens .......................... 137/218
2,752,938 A * 7/1956 Owens .......................... 137/438
(Continued)

FOREIGN PATENT DOCUMENTS

| JP | 56-080566 | 7/1981 |
| KR | 2019970062582 | 12/1997 |

(Continued)

OTHER PUBLICATIONS

International Search Report—PCT/KR2010/000157 dated Sep. 7, 2010.

*Primary Examiner* — Craig Schneider
(74) *Attorney, Agent, or Firm* — Cantor Colburn LLP (57) ABSTRACT

An apparatus for preventing backflow of a fill valve in a water toilet. The apparatus includes a fill valve for permitting and stopping supply of washing water from a hydrant into a water tank, a fixing section fixing the fill valve to an overflow pipe, a float having a packing for opening or closing an opening/closing hole of the fill valve depending on a level of water contained in the water tank, and a backflow-preventing section disposed inside the fill valve. The backflow-preventing section permits washing water to be supplied from the hydrant into the water tank, and prevents washing water from flowing back toward the hydrant. The backflow-preventing section includes a backflow-preventing member mounted to a supply pipe of the fill valve, and an operation control valve seated on a fitting protrusion of the fill valve to control an operation of the backflow-preventing member.

6 Claims, 6 Drawing Sheets

(56) References Cited

U.S. PATENT DOCUMENTS

| | | | |
|---|---|---|---|
| 2,779,350 A * | 1/1957 | Owens | 137/218 |
| 2,869,571 A * | 1/1959 | Price et al. | 137/215 |
| 2,986,155 A * | 5/1961 | Doyle | 137/218 |
| 2,989,071 A * | 6/1961 | Fulton et al. | 137/437 |
| 3,074,684 A * | 1/1963 | Doyle | 251/35 |
| 3,120,855 A * | 2/1964 | Fischer | 137/218 |
| 3,242,940 A * | 3/1966 | Sirotek | 137/218 |
| 3,693,649 A * | 9/1972 | Gordon et al. | 137/414 |
| 4,100,928 A * | 7/1978 | Schoepe | 137/15.18 |
| 4,709,721 A * | 12/1987 | Gish | 137/437 |

FOREIGN PATENT DOCUMENTS

| KR | 20-0297671 | 11/2002 |
|---|---|---|
| KR | 1020070064462 | 6/2007 |
| KR | 20-0441703 | 8/2008 |

\* cited by examiner

APPARATUS FOR PREVENTING BACKFLOW OF FILL VALVE IN WATER TOILET

TECHNICAL FIELD

The present invention relates, in general, to a fill valve in a water toilet, the fill valve being mounted to an overflow pipe so that washing water supplied from a hydrant is efficiently supplied to a water tank and a toilet body, and, more particularly, to an apparatus for preventing backflow of a fill valve in a water toilet, in which, when the supply of washing water from the hydrant to the water tank and the toilet body is stopped, washing water is prevented from flowing back up from the water tank and the toilet body towards the hydrant.

BACKGROUND ART

A water toilet, which is generally installed in a bathroom or a rest room, is equipped with a toilet body on which a user can sit to relieve him/herself. A water tank is provided behind the toilet body, and contains therein washing water, which drains excrement from the toilet body into a water-purifier tank.

In addition, a water supply apparatus, which supplies washing water into the water tank, is disclosed in Korean Registered Utility Model No. 138379, entitled "Apparatus for Supplying Water for Water Tank in Water Toilet," previously filed by the applicant as Application No. 20-1996-0010735.

This registered utility model has the problem of not supplying enough washing water when the washing water has low pressure, since washing water supplied from a hydrant fills up a water tank from bottom to top.

When the level of the washing water contained in the water tank reaches a high water mark, the packing of a float closes an opening/closing hole. As the float rotates and is displaced upwards depending on the level of water and the interval between the packing of the float and the hole for opening and closing becomes narrower, washing water supplied to the hole for opening and closing creates a noise.

In order to solve such a problem, a Korean Patent No. 758827, entitled "Apparatus for Controlling Supply of Water in Water Toilet," was subsequently filed by the applicant as Application No. 10-2005-0124932.

This patent has an advantage in that a fill valve is mounted to the upper end of an overflow pipe to supply washing water to a water tank from top to bottom in order to solve the foregoing problem. However, when the supply of washing water is stopped or suspended, washing water, which is contained in the water tank or in a toilet body, may instantaneously flow back through the fill valve toward a hydrant because of the backflow pressure of washing water, thereby polluting the hydrant. In addition, when the supply of washing water is resumed, it may become unsanitary since water is supplied through the polluted hydrant to a wash basin, a shower, or a kitchen valve.

DISCLOSURE

Technical Problem

Accordingly, the present invention has been made keeping in mind the above problems occurring in the related art, and is intended to provide an apparatus for preventing backflow of a fill valve in a water toilet, which efficiently supplies washing water from a hydrant into a water tank, and in the case of the backflow of washing water, which is supplied to the hydrant, prevents the washing water in the water tank or a toilet body from flowing back.

Further, the present invention serves to provide an apparatus for preventing backflow of a fill valve in a water toilet, which prevents washing water in the water tank and toilet body from flowing back towards the hydrant, thereby preventing the hydrant from being polluted and ensuring sanitary use.

Technical Solution

In an aspect, the present invention provides an apparatus for preventing backflow of a fill valve in a water toilet, including a fill valve for permitting and stopping supply of washing water from a hydrant into a water tank; a fixing section fixing the fill valve to an overflow pipe; a float having a packing for opening or closing an opening/closing hole of the fill valve depending on a level of water contained in the water tank; and a backflow-preventing section disposed inside the fill valve. The backflow-preventing section permits washing water, which is being supplied from the hydrant, to be supplied into the water tank, and prevents washing water inside the water tank from flowing back into the hydrant when washing water flows back. The backflow-preventing section includes a backflow-preventing member mounted to a supply pipe of the fill valve; and an operation control valve seated on a fitting protrusion of the fill valve to control an operation of the backflow-preventing member.

Advantageous Effects

According to the apparatus for preventing backflow of a fill valve in a water toilet of the present invention, when washing water, which is supplied from the hydrant into the water tank, flows back, the backflow-preventing rim of the backflow-preventing member is contracted due to the counter-pressure of washing water, which flows back toward the hydrant. The backflow-preventing rim then comes into close contact with the recess of the operation control member and cuts off the communication between the hydrant and the inside of the water tank, thereby preventing polluted water inside the water tank from flowing back.

Furthermore, the apparatus for preventing backflow of a fill valve in a water toilet of the present invention prevents the hydrant from being polluted by polluted water inside the water tank and ensures it is sanitary when used. This also advantageously affords a user with a product that is increased in reliability.

MAJOR REFERENCE NUMERALS OF THE DRAWINGS

100: apparatus for preventing backflow
110: fill valve
120: fixing section
130: float
140: backflow-preventing section
141: backflow-preventing member 141a: backflow-preventing body
141b: backflow-preventing rim
142: operation control member
142a: control body
142b: through hole
142b': guide rib
142c: recess

MODE FOR INVENTION

Figure 1:
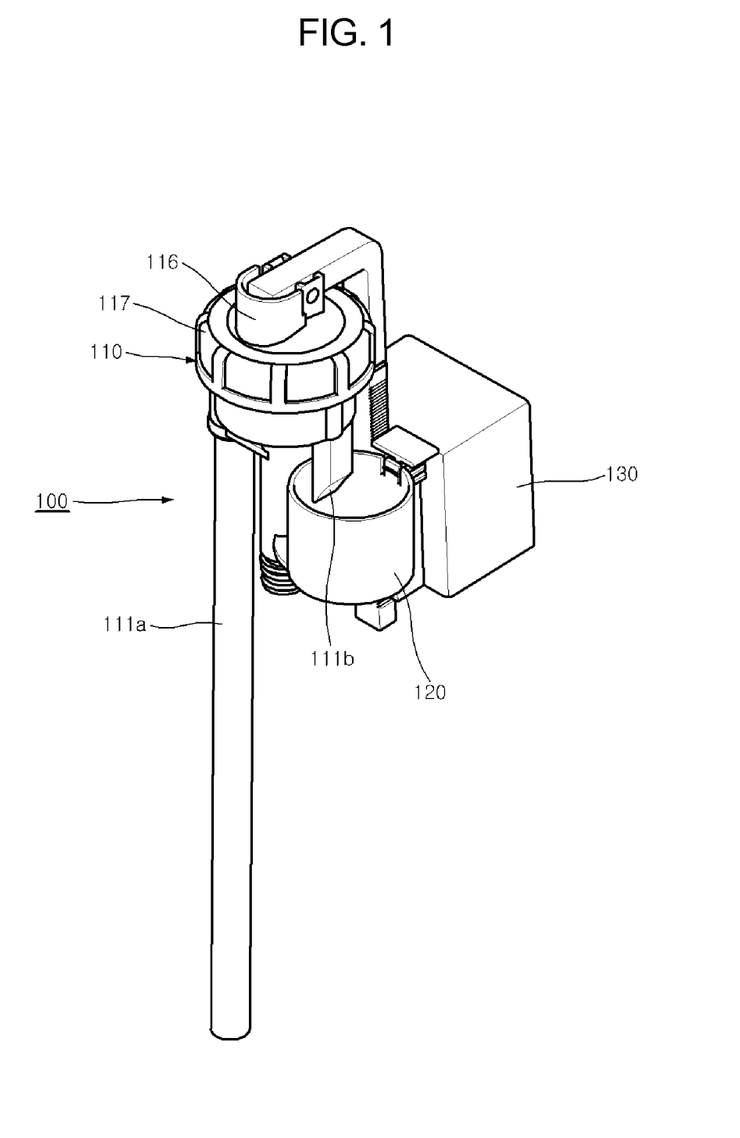
FIG. 1 is a perspective view of the present invention.
Figure 2:
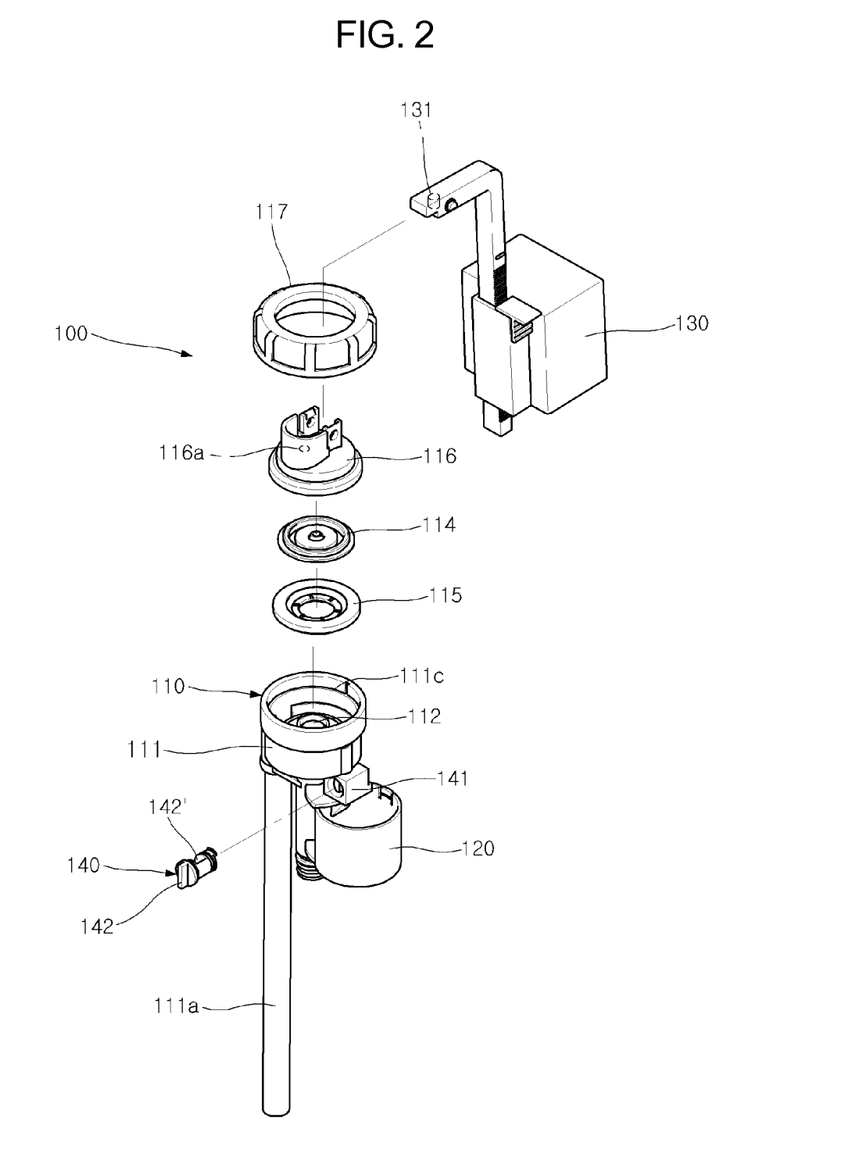
FIG. 2 is an exploded perspective view of the present invention.

Hereinafter an embodiment of the present invention will now be described in detail with reference to the accompanying drawings. FIG. 1 is a perspective view of the present invention, and FIG. 2 is an exploded perspective view of the present invention.

The apparatus for preventing backflow 100 of a fill valve in a water toilet of the present invention includes a fill valve 110, a fixing section 120, a float 130 and a backflow-preventing section 140. The fill valve 110 permits and stops the supply of washing water from a hydrant into a water tank 10. The fixing section 120 fixes the fill valve 110 to an overflow pipe 20. The float 130 has a packing 131, which opens or closes an opening/closing hole 116a of the fill valve 110 depending on the level of water contained in the water tank 10. The backflow-preventing section 140 is mounted inside the fill valve 110, permits the washing water, which is supplied from the hydrant, into the water tank, and prevents the washing water inside the water tank 10 from flowing back into the hydrant.

The fill valve 110 includes a valve body 111, which has a water tank-side water supply pipe 111a and a rim-side water supply pipe 111b extending through opposite ends thereof, with a supply pipe 112 communicating with the hydrant. An air passage hole 113 is formed in the bottom of the valve body 111. A water supply valve 114, which opens or closes the supply pipe 112 is provided. A support member 115 is disposed inside the valve body 111 to support the water supply valve 114. A cap 116 presses the support member 115 and the water supply valve 114, and the opening/closing hole 116a extends through the cap 116. A fastening nut 117 is fixedly fastened to the valve body 111, with the cap 116 being received therein.

In addition, the backflow-preventing section 140 has a backflow-preventing member 141 disposed in the supply pipe 112 of the fill valve 110. The backflow-preventing section 140 also includes an operation control member 142, which is seated on a fitting protrusion 111c of the fill valve 111 to control the operation of the backflow-preventing member 141. The following is a more in-depth description of these The backflow-preventing member 141 has a backflow-preventing body 141a, which has a mounting-hole 141a' formed therein, the mounting-hole 141a' enabling the backflow-preventing body 141a to be mounted to the supply pipe 112, and a backflow-preventing rim 141b, which protrudes from the outer circumference of the backflow-preventing body 141a and is in close contact with the operation control member 142.

It is preferred that the backflow-preventing member 141 is made of a soft material.

The operation control member 142 has a control body 142a, which is seated on the fitting protrusion 111c of the fill valve 111. A through-hole 142b extends through the central portion of the control body 142a to receive the outer circumference of the supply pipe 112. A recess 142c is formed in the underside of the control body 142a so that the backflow-preventing rim 141b of the backflow-preventing member 141 comes into close contact with the recess 142c.

In addition, guide ribs 142b' radially protrude from the inner circumference of the through-hole 142b of the operation control member 142 so that they come into close contact with the supply pipe 112.

A description is given below of the process of assembling and disassembling the present invention configured as described above.

Figure 3:
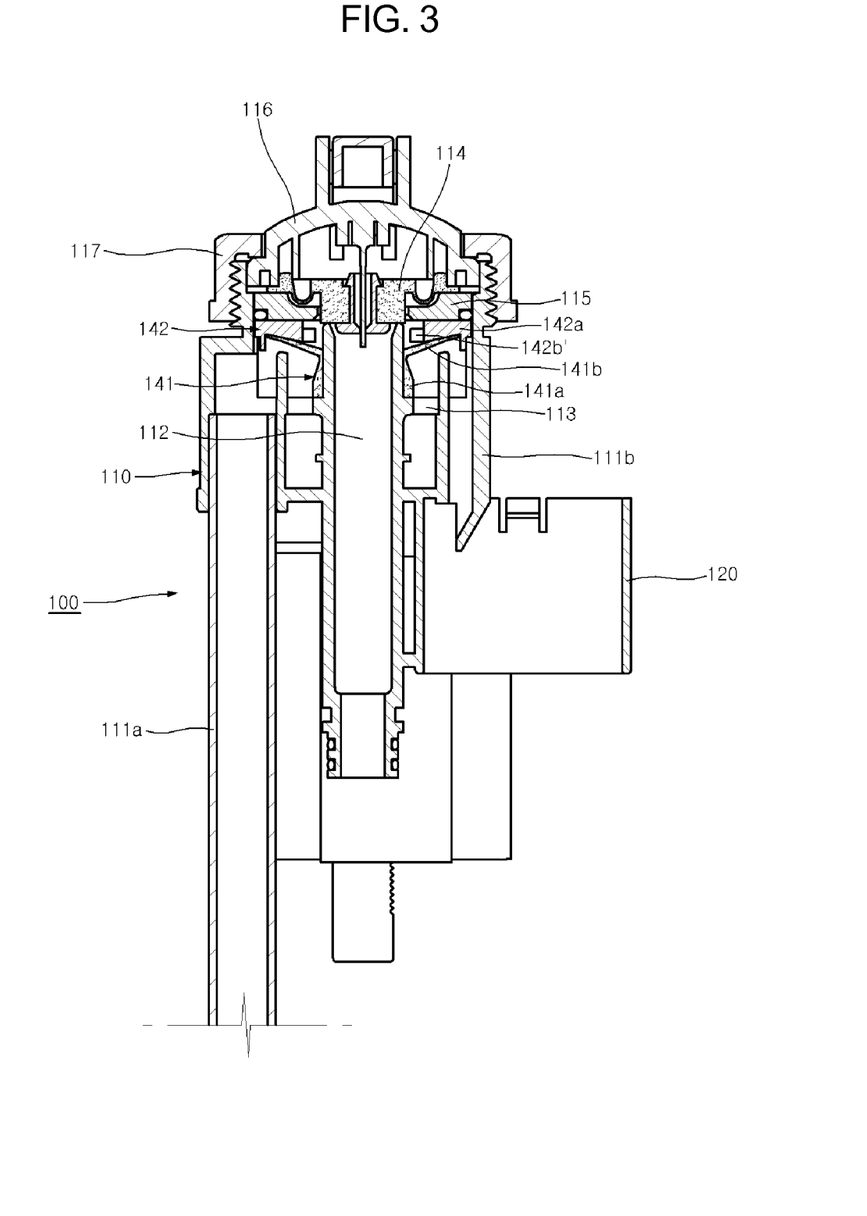
FIG. 3 is a cross-sectional view of the present invention.
Figure 4:
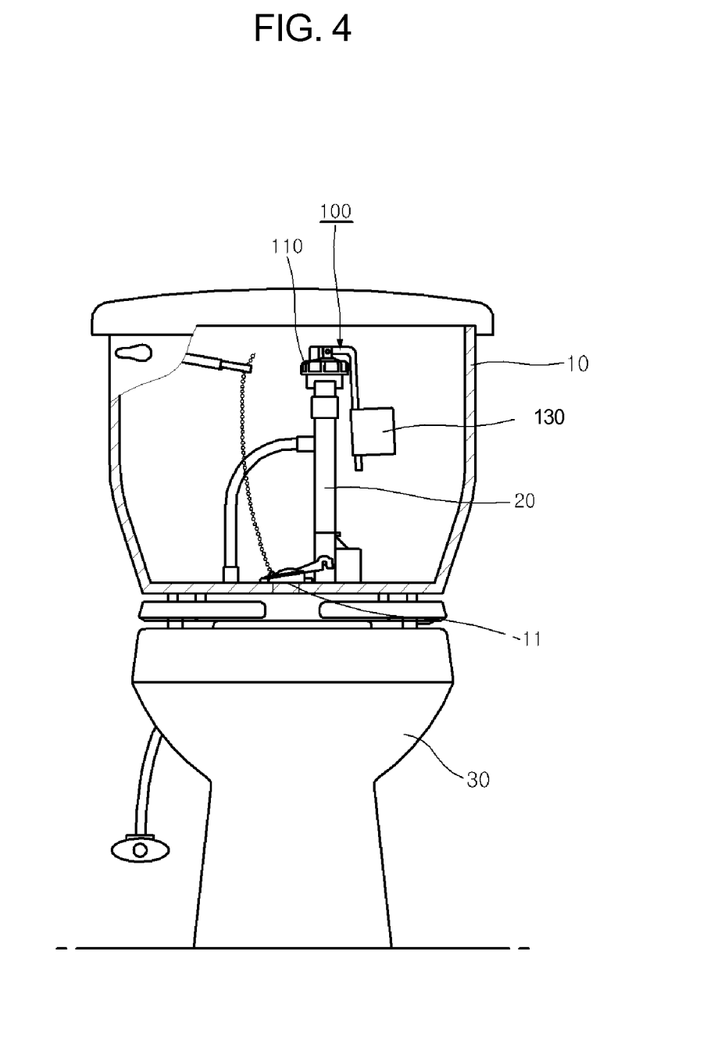
FIG. 4 is a view showing the state of installation of the present invention.

First, as shown in FIG. 3 and FIG. 4, the backflow-preventing body 141a is coupled to the supply pipe 112 of the fill valve 110 and has the mounting-hole 141a' disposed therein. The operation control member 142 is seated on the fitting protrusion 111c of the valve body 111 so that it is positioned above the backflow-preventing member 141.

Here, the through-hole 142b of the operation control member 142 receives the supply pipe 112, and the control body 142a is seated on the fitting protrusion 111c. The guide ribs 142b', which radially protrude from the inner circumference of the through-hole 142b, are in close contact with the outer circumference of the supply pipe 112. The backflow-preventing rim 141b of the backflow-preventing member 141 is brought into close contact with the recess 142c formed in the underside of the control body 142a.

In addition, the support member 115 is seated on top of the operation control member 142, and the supply valve 114 is seated on the support member 115. Afterwards, the cap 116 is seated on the supply valve 114, and then the fastening member 117, which receives the cap 116 therein, is fixedly fastened to the valve body 111.

The packing 131, which opens or closes the opening/closing hole 116a of the cap 116, is disposed inside the float 130 and is rotatably mounted on the cap 116. After the supply pipe 112 of the fill valve 110 to which the float 130 is coupled, is connected to the hydrant, it is fixed to the overflow pipe 20 using the fixing section 120. Then, assembly of the apparatus for preventing backflow 100 of a fill valve in a water toilet of the present invention is completed.

Here, although the fixing section 120 can be fixed to the overflow pipe 20 so that the fill valve 110 is submerged by washing water contained inside the water tank 10, the fixing section 120 is preferably fixed to the upper end of the overflow pipe 20 so that the fill valve 110 is not submerged in washing water.

A description is given below of the process of operating the present invention, which is assembled as above. When a user manipulates an operating lever (not shown) after having relieved him/herself, a siphon cover (not shown) is rotated upwards to open a drain hole 11 of the water tank 10. Then, wash water contained in the water tank 10 is discharged into a toilet body 30 through the opened drain 11, thereby performing washing that discharges the excrement into a water-purifier tank.

Figure 5:
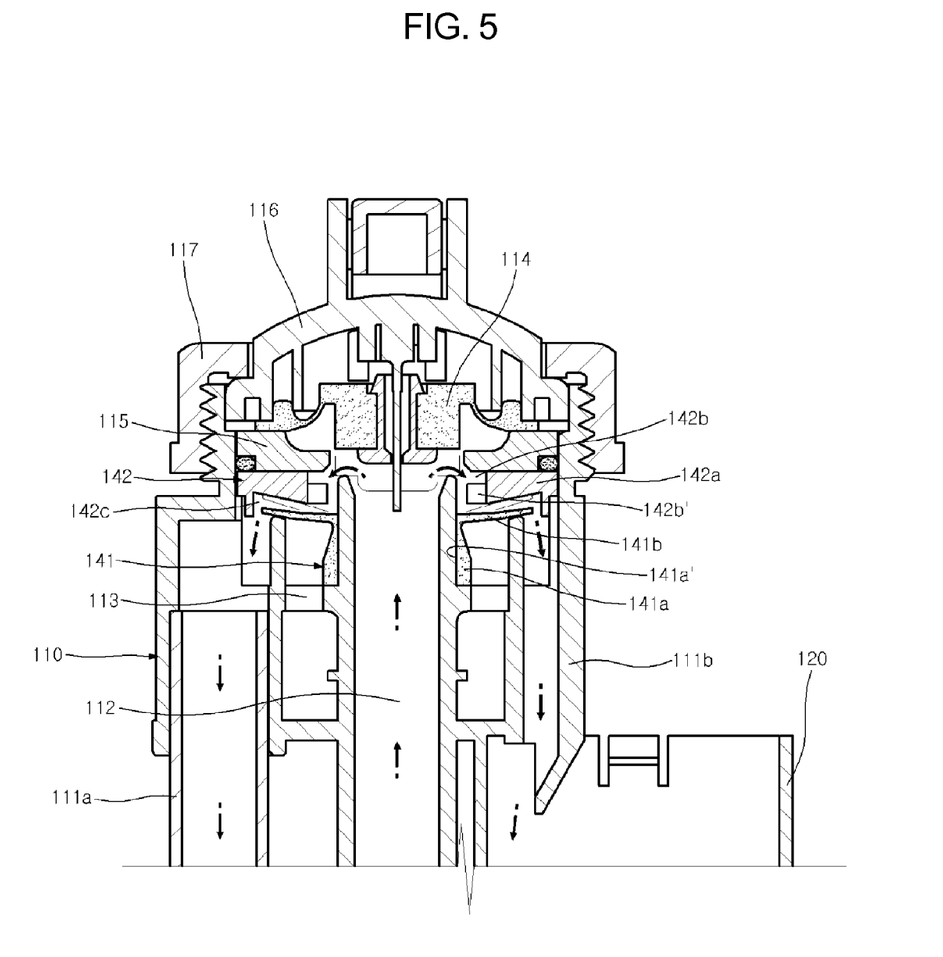
FIG. 5 and FIG. 6 are views showing the states in which the present invention operates.

As the level of water is lowered in response to the washing water having been discharged through the drain hole 11, the float 130 is rotated downwards about the cap 116, as shown in FIG. 5, so that the packing 131 of the float 130 opens the opening/closing hole 116a of the cap 116. Then, the washing water which was between the water supply valve 114 and the cap 116 is discharged into the water tank 10 through the opening/closing hole 116a so that the force used to support the water supply valve 114 is lost.

Here, due to the hydraulic pressure of the washing water, which is supplied from the hydrant into the supply pipe 112, the water supply valve 114, which has lost the supporting force, is moved upwards through the inside of the cap 116 to open the supply pipe 112. It also passes through the opened supply pipe 112 as well as the through-hole 142b and the guide ribs 142b' of the operation control member 142 to press the backflow-preventing rim 141b of the backflow-preventing member 141. Then, the backflow-preventing rim 141b is rotated downwards about the backflow-preventing body 141a and is dislodged from the recess 142c.

When the backflow-preventing rim 141b is dislodged from the recess 142c, washing water is supplied through the control body 142a of the operation control member 142 and the backflow-preventing rim 141b of the backflow-preventing member 141. Then, washing water is mostly supplied through the water tank-side supply pipe 111a and the rim-side supply pipe 111b, but is partially supplied between the water supply valve 114 and the cap 116 through a through-hole (not shown) of the water supply valve 114.

When the toilet body 30 is blocked by the excrement of the user and thus washing is not carried out, the toilet body 30 contains polluted water in which the excrement and washing water are mixed together. At the same time, washing water, which is supplied to the supply pipe 112, stays in the water tank 10, and is also mixed with and polluted by the polluted water. Part of the polluted water is discharged into the water-purifier tank through the overflow pipe 20 together with washing water, which is supplied to the supply pipe 112.

In the state in which washing water supplied from the hydrant is washing out the excrement, the supply of washing water from the hydrant to the supply pipe 112 may be stopped or the supply of water may be stopped. This causes washing water, which is supplied from the hydrant, to flow back, thereby creating a difference in pressure, i.e. counter-pressure, so that the polluted water in the water tank 10 is instantaneously taken in.

Figure 6:
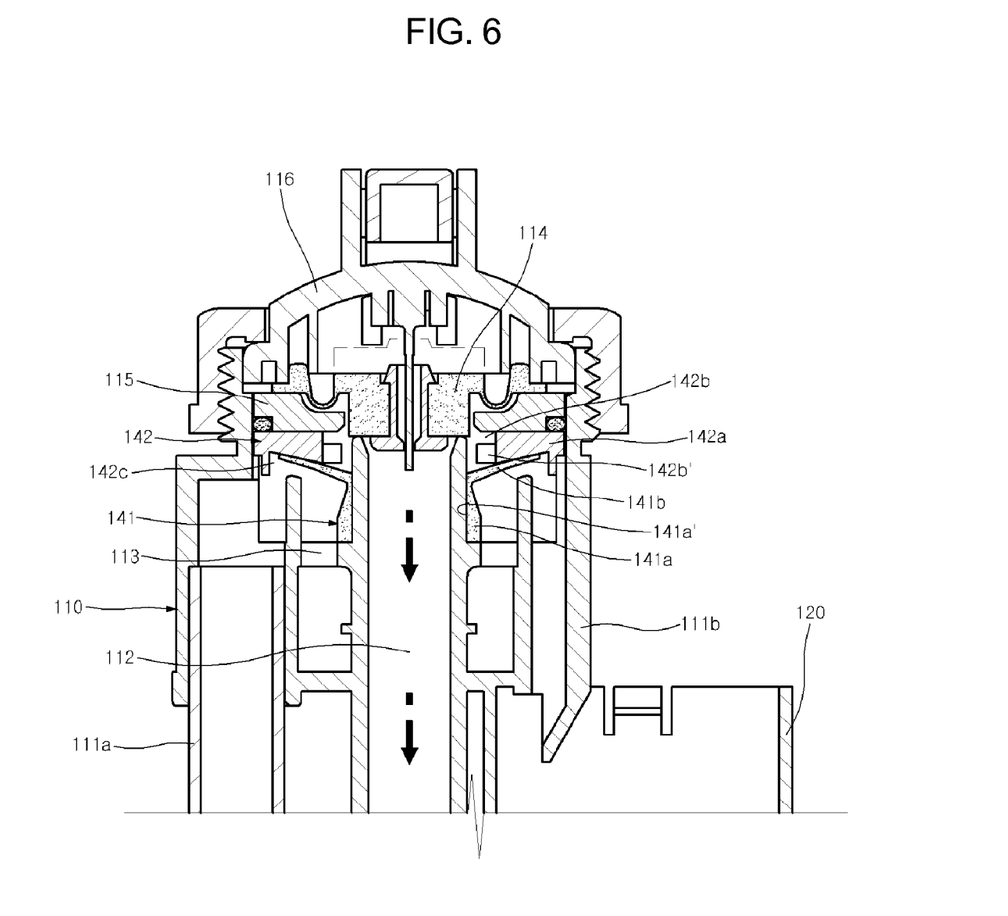

When the supply of washing water is stopped or the supply of water is stopped, as shown in FIG. 6, the backflow-preventing rim 141b of the backflow-preventing member 141 is restored to its original position due to its restorative force, thereby coming into close contact with the recess 142c of the operation control member 142. At the same time, the counter-pressure brings the backflow-preventing rim 141b into closer contact with the recess 142c. This cuts off the communication between the supply pipe 112 and the inside of the water tank 10, so that the polluted water inside the water tank 10 does not flow back, thereby preventing the hydrant from being polluted.

When the backflow of the polluted water from the water tank 10 into the hydrant is cut off using the backflow-preventing section 140, external air is introduced into the opening/closing hole 116a between the water supply valve 114 and the cap 116, the opening/closing hole 116a being opened by the backflow of washing water, and is introduced into the air passage hole 113 of the fill valve 110. This can consequently balance the counter-pressure of the hydrant and prevent the hydrant from being polluted so that the hydrant can be used sanitarily.

Although the present invention has been described with reference to the certain embodiments and the drawings, the terms and words used in the disclosure and accompanying claims are by no means limited to typical or literal meanings thereof but should be interpreted as meanings and concepts that coincide with the technical principle of the present invention. Therefore, the foregoing embodiments described in the specification and illustrated in the drawings are merely an example of the present invention, but do not embrace all the technical principles of the present invention. It should also be understood that various equivalents and alterations can be made without departing from the scope of the accompanying claims.

The invention claimed is:

1. An apparatus for preventing a backflow of a fill valve in a water toilet, comprising:
a fill valve for permitting and stopping supply of washing water from a hydrant into a water tank;
a fixing section fixing the fill valve to an overflow pipe;
a float having a packing for opening or closing an opening/closing hole of the fill valve depending on a level of water contained in the water tank; and
a backflow-preventing section disposed inside the fill valve, wherein the backflow-preventing section permits washing water, which is being supplied from the hydrant, to be supplied into the water tank, and prevents washing water inside the water tank from flowing back into the hydrant when washing water flows back,
wherein the backflow-preventing section includes:
a backflow-preventing member mounted to a supply pipe of the fill valve; and
an operation control member seated on a fitting protrusion of the fill valve to control an operation of the backflow-preventing member; and
wherein the fill valve comprises:
a valve body, which has the supply pipe communicating with a hydrant, and which has a water tank-side water supply pipe and a rim-side water supply pipe extending through opposite ends thereof;
an air passage hole formed in a bottom of the valve body;
a water supply valve, which opens or closes the supply pipe;
a support member disposed inside the valve body to support the water supply valve;
a cap pressing the support member and the water supply valve, wherein the cap has an opening/closing hole formed therein;
a fastening nut fixedly fastened to the valve body, wherein the cap is received inside the fastening nut.

2. The apparatus of claim 1, wherein the backflow-preventing member comprises:
a backflow-preventing body having a mounting-hole formed therein, the mounting-hole enabling the backflow-preventing body to be mounted to the supply pipe; and
a backflow-preventing rim protruding from an outer circumference of the backflow-preventing body, the backflow-preventing rim being in close contact with the operation control member.

3. The apparatus of claim 1, wherein the backflow-preventing member is made of a soft material.

4. The apparatus of claim 1, wherein the operation control member comprises:
a control body seated on a fitting protrusion of the fill valve;
a through-hole formed in a central portion of the control body, the through-hole receiving an outer circumference of the supply pipe; and
a recess depressed in an underside of the control body, wherein a backflow-preventing rim of the backflow-preventing member comes into close contact with the recess.

5. The apparatus of claim 4, further comprising guide ribs radially protruding from an inner circumference of the through-hole of the operation control member, the guide ribs being in close contact with the supply pipe.

6. The apparatus of claim 2, wherein the backflow-preventing member is made of a soft material.

* * * * *